United States Patent [19]

Kern

[11] 4,043,312
[45] Aug. 23, 1977

[54] BARBECUE GRILL

[76] Inventor: Eugene F. Kern, 12115 Lake Meade Court, Creve Coeur, Mo. 63141

[21] Appl. No.: 613,571

[22] Filed: Sept. 15, 1975

[51] Int. Cl.² .......................................... A47J 37/00
[52] U.S. Cl. ................................ 126/41 R; 431/125
[58] Field of Search ............... 126/41 R, 25 R, 92 AC; 431/125

[56] References Cited

U.S. PATENT DOCUMENTS

| | | | |
|---|---|---|---|
| 1,777,154 | 9/1930 | Sharp | 126/92 AC |
| 3,407,803 | 10/1968 | Cervenak | 126/25 R |
| 3,500,812 | 3/1970 | Korngold | 126/25 R |
| 3,613,657 | 10/1971 | Wilska et al. | 126/41 R |
| 3,638,634 | 2/1972 | Bolitho | 126/41 R |
| 3,638,635 | 2/1972 | Drenman | 126/41 R |
| 3,789,822 | 2/1974 | Schantz | 126/41 R |
| 3,827,423 | 8/1974 | Bolitho | 126/41 R |

FOREIGN PATENT DOCUMENTS

| | | | |
|---|---|---|---|
| 399,196 | 9/1933 | United Kingdom | 126/92 AC |

*Primary Examiner*—Edward G. Favors
*Attorney, Agent, or Firm*—F. Travers Burgess

[57] ABSTRACT

A gas fired barbecue grill is provided with a horizontal refractor insert mounting briquette-like elements of fireproof material between the burners and the grill to simulate a charcoal or similar fire and eliminate grease fires by preventing grease from dropping on the burners.

8 Claims, 4 Drawing Figures

BARBECUE GRILL

BACKGROUND OF THE INVENTION

1. Field of the Invention

The invention relates to gas fired barbecue grills and consists particularly in means for simulating the smoke from a charcoal fire.

2. The Prior Art

Conventional gas fired barbecue grills consist of a housing having an upwardly open fire box containing a gas burner unit and mounting a meat-supporting grate spaced above the burner unit, and a hinged cover. Grease dripping from meat on the grate onto the exposed gas flames frequently causes grease fires, and because it burns instead of smoldering, it adds nothing to the flavor or aroma of the cooked meat.

SUMMARY OF THE INVENTION

An object of the invention is the provision of a gas fired barbecue grill constructed to cause cooking grease to smolder and smoke, but not to burn.

A further object is the provision of a barbecue grill having the convenience of cooking with natural or manufactured gas and thereby eliminating the mess associated with charcoal or coke briquettes, while providing greaseless fire with true smoke previously attainable only with charcoal, coke briquettes, or similar fuel, the distinctive taste of barbecue resulting from the smoke of dripping meat juices smoldering on the hot coals.

An additional object is to provide, in a gas barbecue grill, means whereby raw wood chips such as hickory chips may be utilized to give special flavor effects by smoldering and smoking without bursting into flame as they would on conventional gas fired barbecue grills.

DETAILED DESCRIPTION OF THE INVENTION

Figure 1:
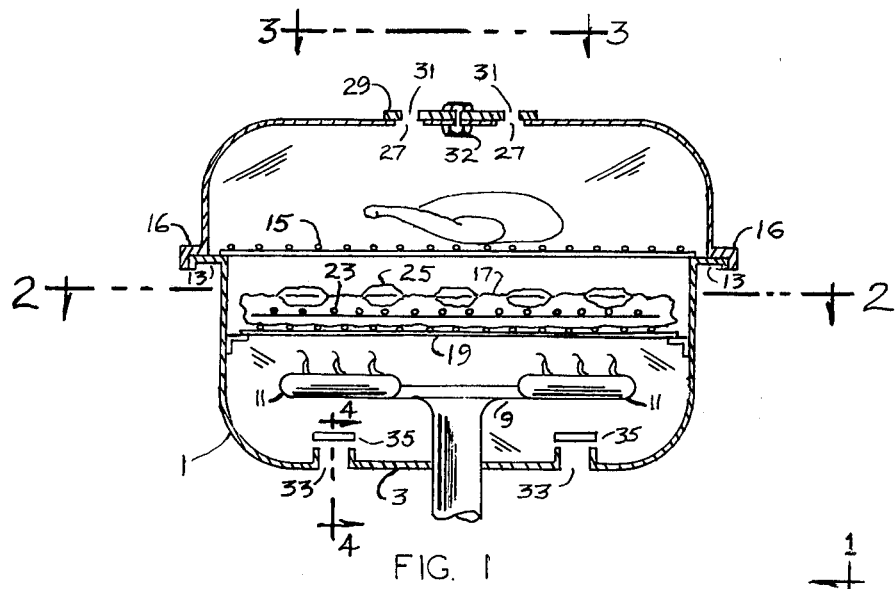
FIG. 1 is a transverse vertical sectional view of a barbecue grill incorporating the invention, taken along line 1—1 of FIG. 2.
Figure 2:
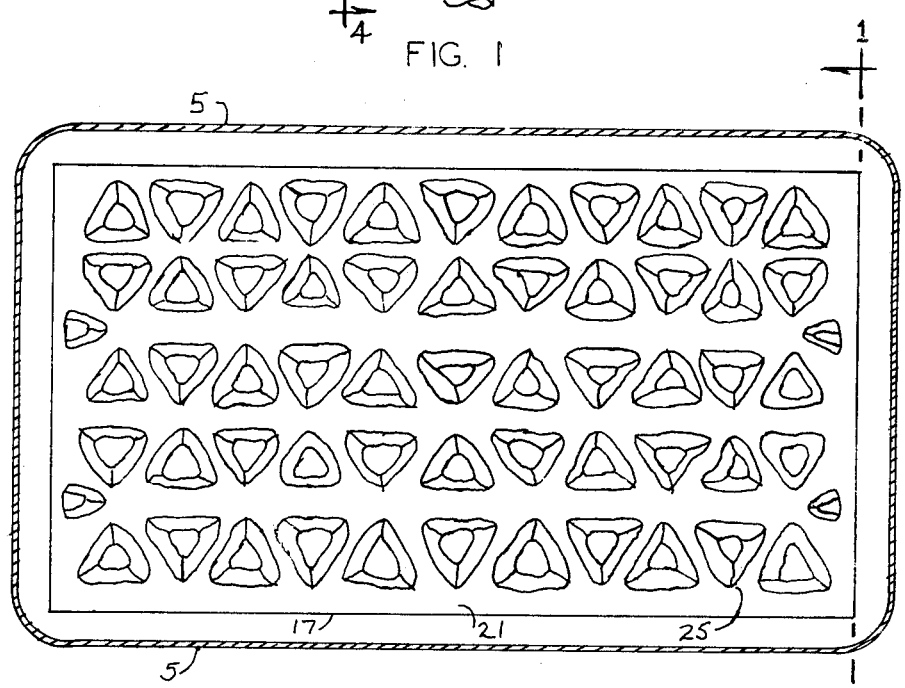
FIG. 2 is a horizontal sectional view along line 2—2 of FIG. 1.
Figure 3:
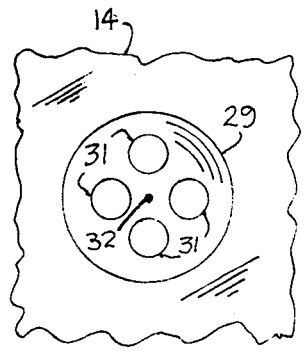
FIG. 3 is a fragmentary top view of the grill cover showing the vent.
Figure 4:
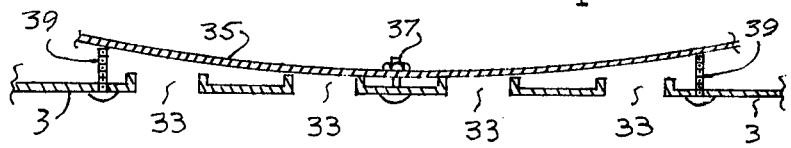
FIG. 4 is a longitudinal vertical sectional view taken along line 4—4 of FIG. 1.

The numeral 1 denotes a barbecue grill bottom portion or fire box having a horizontal bottom wall 3, and upright side and end walls 5 and 7. A gas burner unit 9 is positioned in the lower part of fire box 1 and has a plurality of upwardly facing burners 11. Along the top of side and end walls 5 and 7 fire box 1 is formed with an outward peripheral flange 13 and a meat-supporting grate 15 is suitably supported therefrom.

The grill is provided with a suitable lid or cover 14 which may be hinged to one of the fire box side walls 5 and has a peripheral flange 16 along its lower rim matingly engageable with fire box flange 13.

In order to prevent juices from meat cooking on grate 15 from dripping onto flames emanating from burners 11, an insert 17 of refractory ceramic or other fireproof material of the same plan as fire box 1, but of slightly less length and width, rests on a subgrate 19 supported from side and end walls 5 and 7 at a level intermediate burners 11 and meat-supporting grate 15.

Insert 17 preferably has a slab-like base 21, internally reinforced with wire mesh 23 such as hardware cloth, and a plurality of closely spaced lumps 25 (also of refractory or other fireproof material similar in shape and size to charcoal or coke briquettes) are bonded to the upper surface of base 21 preferably by refractory cement. For best results, the adjacent areas of base 21 are approximately one-half to one-third the thickness of the simulated briquettes 25. For the simulated briquettes 25 any refractory material may be used, as well as natural stone, lava rock, man-made rock or other fireproof material of similar characteristics. For ease of commercial manufacture it is conceivable and desirable that the base 21 of insert 17 and the simulated briquettes 25 could be made in one piece of the same type of material from either naturally or synthetically castable or machinable elements. From the top, the insert resembles a bed of coals and it functions similarly to a bed of real coals such that meat juices dripping down on heated lumps 25 will smolder, but not flame, and will produce smoke rising through meat-supporting grate 15 to contact meat pieces thereon and impart additional aroma and flavor to the latter.

To facilitate upward movement of the smoke and provide a vent for it, lid 14 is formed with a plurality of vent holes 27 and a disk-shaped valve member 29 formed with similarly spaced holes 31 is rotatably mounted on a pivot member 32 affixed to lid 14 in a central position with respect to holes 27 to permit selective rotation of valve member 29, thus permitting variations from full registry of its holes 31 with lid holes 27 to nonregistry. This makes possible intermittent draft adjustment during cooking. During the initial heat-up period, valve member 29 is closed and thereafter opened as the smoking action continues.

While the flame receives its primary supply of air for combustion through the burner unit, for supplying a secondary supply of air for combustion, two parallel sets of aligned holes 33 are formed in fire box bottom wall 3 and each set of holes is provided with an adjustable closure in the form of a flapper valve consisting of a pair of resilient metal strips 35, each anchored at its center intermediate the ends of the set of holes 33, to bottom wall 3 by a bolt 37 and biased by its resiliency toward sealing engagement with the inner rims of holes 33. For adjusting the opening of strips 35, adjacent the extreme end holes 33 of each set, jack screws 39 threadably received in bottom wall 3 with their heads protruding outwardly therefrom and their tips abutting the end portions of the metal strip 35. It is contemplated that a one-time permanent adjustment would be made with this valve to provide the optimum secondary air supply. Openings 33 also serve as a safety vent for unlighted gas to permit its escape from the grill and dispersion into the atmosphere.

It will be understood that other types of adjustable dampers may be substituted for rotary valve 29 and flapper The details of the structure may be varied substantially without departing from the spirit of the invention and the exclusive use of such modifications as come within the scope of the appended claims is contemplated.

I claim:

1. In a barbecue grill, a housing have an upwardly open fire box, a gas burner unit in said fire box, a grate for supporting meat mounted on said fire box above said burner unit, and a shield between said burner unit and said grate preventing cooking juices from dripping on said burner unit, said shield comprising a slab of refractory material reinforced with wire mesh and having lumps of refractory material permanently united with said slab and projecting upwardly from its top surface to simulate coals.

2. In a barbecue grill according to claim 1, said lumps being cemented to said slab.

3. In a barbecue grill according to claim 2, means supporting said insert from the sides of said fire box.

4. In a barbecue grill according to claim 3, said supporting means comprising a subgrate supported from the sides of said fire box.

5. In a barbecue grill, a housing having an upwardly open fire box, a gas burner unit in said fire box, a grate for supporting meat mounted on said fire box above said burner unit, and a shield between said burner unit and said grate preventing cooking juices from dripping on said burner unit, said shield comprising a slab of refractory material with lumps of refractory material projecting upwardly from its top surface to simulate coals, said fire box having a bottom wall and an adjustable air supply vent in said bottom wall, said adjustable vent comprising a hole in said bottom wall of said fire box, a resilient metal strip anchored to said bottom wall at one side of said hole and biased by its resiliency to seal said hole, and selectively openable adjustable jacking means for urging the free end of said strip away from said bottom wall to unseal said hole.

6. In a barbecue grill according to claim 5, a lid for said fire box adapted to close the top thereof.

7. In a barbecue grill according to claim 6, a selectively adjustable outlet vent in said lid.

8. In a barbecue grill according to claim 1, said slab and said lumps being formed integrally from a single piece of material.

* * * * *